US 8,290,508 B2
Oct. 16, 2012

(12) United States Patent
Medapalli et al.

(10) Patent No.: US 8,290,508 B2
(45) Date of Patent: Oct. 16, 2012

(54) ESTIMATING A SUBSCRIBER LOCATION

(75) Inventors: Kameswara Medapalli, Santa Clara, CA (US); Robert G. Lorenz, Santa Clara, CA (US); Bertrand Hochwald, Santa Clara, CA (US); Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 505 days.

(21) Appl. No.: 12/460,693

(22) Filed: Jul. 23, 2009

(65) Prior Publication Data

US 2011/0021210 A1    Jan. 27, 2011

(51) Int. Cl.
    *H04W 24/00* (2009.01)
(52) U.S. Cl. .................................... 455/456.1; 370/350
(58) Field of Classification Search .................. None
    See application file for complete search history.

(56) References Cited

U.S. PATENT DOCUMENTS

| | | | |
|---|---|---|---|
| 2002/0004398 A1* | 1/2002 | Ogino et al. | 455/456 |
| 2006/0003767 A1* | 1/2006 | Kim et al. | 455/436 |
| 2006/0098752 A1* | 5/2006 | Song et al. | 375/260 |
| 2007/0298761 A1 | 12/2007 | Bani Hani | |
| 2008/0056195 A1* | 3/2008 | Lee et al. | 370/331 |
| 2009/0047979 A1 | 2/2009 | Oh et al. | |
| 2009/0098903 A1 | 4/2009 | Donaldson | |
| 2009/0180518 A1* | 7/2009 | Ishii et al. | 375/130 |
| 2010/0150117 A1* | 6/2010 | Aweya et al. | 370/338 |

OTHER PUBLICATIONS

Wenhia Jiao, Pin Jiang, Ruoju Liu, Wenbo Wang, Yuanyuan Ma, Providing Location Services for Mobile WiMAX, May 30, 2008, ICC 2008 IEEE International Conference on Communications.*
Richard Walter Klukas (A Superresolution Based Cellular Positioning System Using GPS Time Synchronization, Dec. 1997, University of Calgary.*

* cited by examiner

*Primary Examiner* — Vladimir Magloire
(74) *Attorney, Agent, or Firm* — Sterne, Kessler, Goldstein & Fox P.L.L.C.

(57) ABSTRACT

A method and apparatus of estimating a location of a subscriber are disclosed. One method includes receiving a request for the location of the subscriber. The subscriber's serving base station, and a plurality of neighboring base stations sensed by the subscriber, are identified. The subscriber obtains a time delay from the serving base. The subscriber estimates a distance between the subscriber and the serving base station. The subscriber receives frames and estimates a delta time for each of the selected neighboring base stations for the subscriber to synchronize to each of the selected neighboring base stations. The subscriber estimates distances between the subscriber and each of the selected neighboring base. The subscriber location is estimated by trilateration of the distance between the subscriber and the serving base station, and the distances between the subscriber and each of the selected neighboring base stations.

15 Claims, 6 Drawing Sheets

ESTIMATING A SUBSCRIBER LOCATION

FIELD OF THE DESCRIBED EMBODIMENTS

The described embodiments relate generally to wireless positioning. More particularly, the described embodiments relate to methods and systems for estimating a location of a wireless subscriber.

BACKGROUND

Internet advertising is continually growing at a rapid pace. One goal of internet advertising is to specifically target the advertising to particular clients. The client's location is an ideal piece of information that can be used for targeted advertising. Knowing the client's location (particularly, a mobile client) allows for advertising of goods and services that are located physically close to the client, and therefore, more likely to be purchased by the client.

Additionally, location based advertising is convenient to the client. For example, a mobile user client can use their location information to provide intelligent searching of locations that the mobile user client is seeking, such as, nearby restaurants, gas stations or other attractions.

GPS (global positioning systems) which can provide client locations are presently being deployed in cell phones. However, GPS technology adds costs to the manufacturing of mobile devices, and does not work well indoors.

It is desirable for to have a system and method for aiding mobile subscriber location estimation.

SUMMARY

An embodiment includes a method of estimating a location of a subscriber. The method includes receiving a request for the location of the subscriber. The subscriber's serving base station, and a plurality of neighboring base stations sensed by the subscriber, are identified. At least two of the neighboring base stations are selected to aid in estimating the location of the subscriber. Stored locations of the serving base station and the selected neighboring base stations are accessed. The subscriber obtains a time delay from the serving base station for maintaining synchronization of the subscriber with the serving base station. The subscriber estimates a distance between the subscriber and the serving base station based on the time delay. The subscriber receives frames including preambles from each of the selected neighboring base stations, and estimates a delta time for each of the selected neighboring base stations for the subscriber to synchronize to each of the selected neighboring base stations. The subscriber estimates distances between the subscriber and each of the selected neighboring base stations based on the time delay and the delta time of each of the selected neighboring base stations. The subscriber location is estimated by trilateration of the distance between the subscriber and the serving base station, and the distances between the subscriber and each of the selected neighboring base stations.

Other aspects and advantages of the described embodiments will become apparent from the following detailed description, taken in conjunction with the accompanying drawings, illustrating by way of example the principles of the described embodiments.

DETAILED DESCRIPTION

Embodiments of a subscriber estimating a location are disclosed. The embodiments can provide a mobile subscriber with an alternative to global positioning signals (GPS), or the embodiments can supplement GPS.

Figure 1:
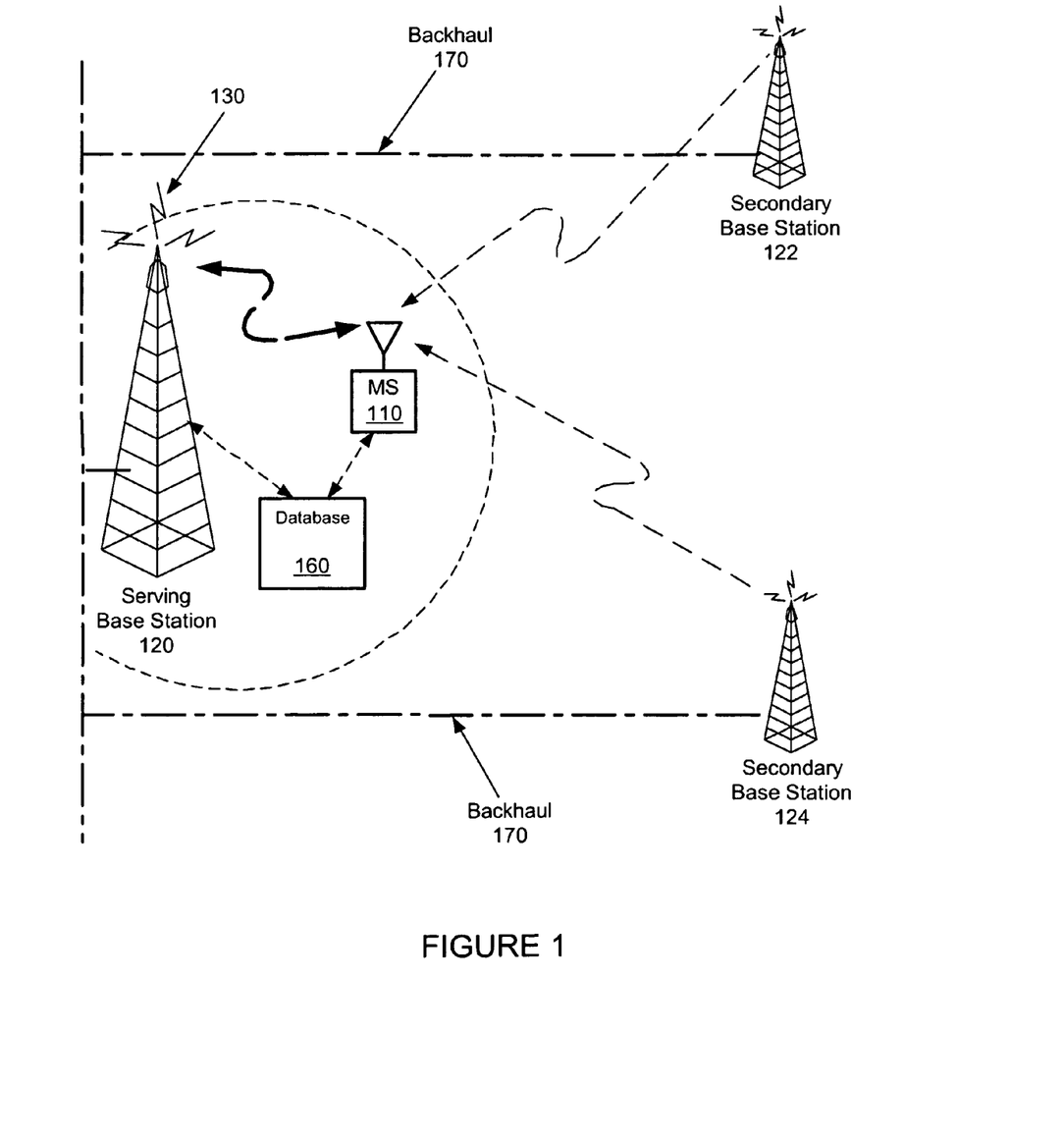
FIG. 1 shows an example of a subscriber communicating with a base station within a cellular network.

FIG. 1 shows an example of a subscriber (mobile subscriber (MS)) 110 communicating with a serving base station 120. The subscriber 110 can also receive wireless signals from neighboring base stations 122, 124. The serving base station 120 can be, for example, a WiMAX base station that the subscriber 110 is maintaining two-way communication. The two-ways communication can be voice or any other type of data. An embodiment includes the serving base station being the base station than provides the subscriber 110 with the best quality link.

The subscriber 110 can additionally obtain information from the serving base station 120 that can be used to aid the subscriber 110. For example, the subscriber 110 can obtain information about the other base stations 122, 124, such as, the positions (locations) of the other base stations 122, 124. Information can be stored in a database 160, and accessed through the subscriber 110 or the serving base station 120. The network can include a backhaul connection 170 that interconnects the base stations. Therefore, the base stations can each update the other base stations with useful information.

The base stations 120, 122, 124 can be synchronized, for example, to a GPS clock. Due to being synchronized, frames (including both downlink and uplink sub-frames) of wireless signals of the base stations 120, 122, 124 are synchronized.

Other information that the serving base station 120 can provide the subscriber 110 includes a neighbor base station advertisement list that the subscriber 110 can use to identify the base stations from which the subscriber 110 should be able to receive signals. The neighboring base station advertisement list can also provide the subscriber 110 with base station information that allows the subscriber 110 to be aware of other bases stations that the subscriber 110 could select if the subscriber 110 changes locations. The selection can include a new serving base station, and/or new neighboring base stations for receiving signals for position estimation by the subscriber 110.

Figure 2:
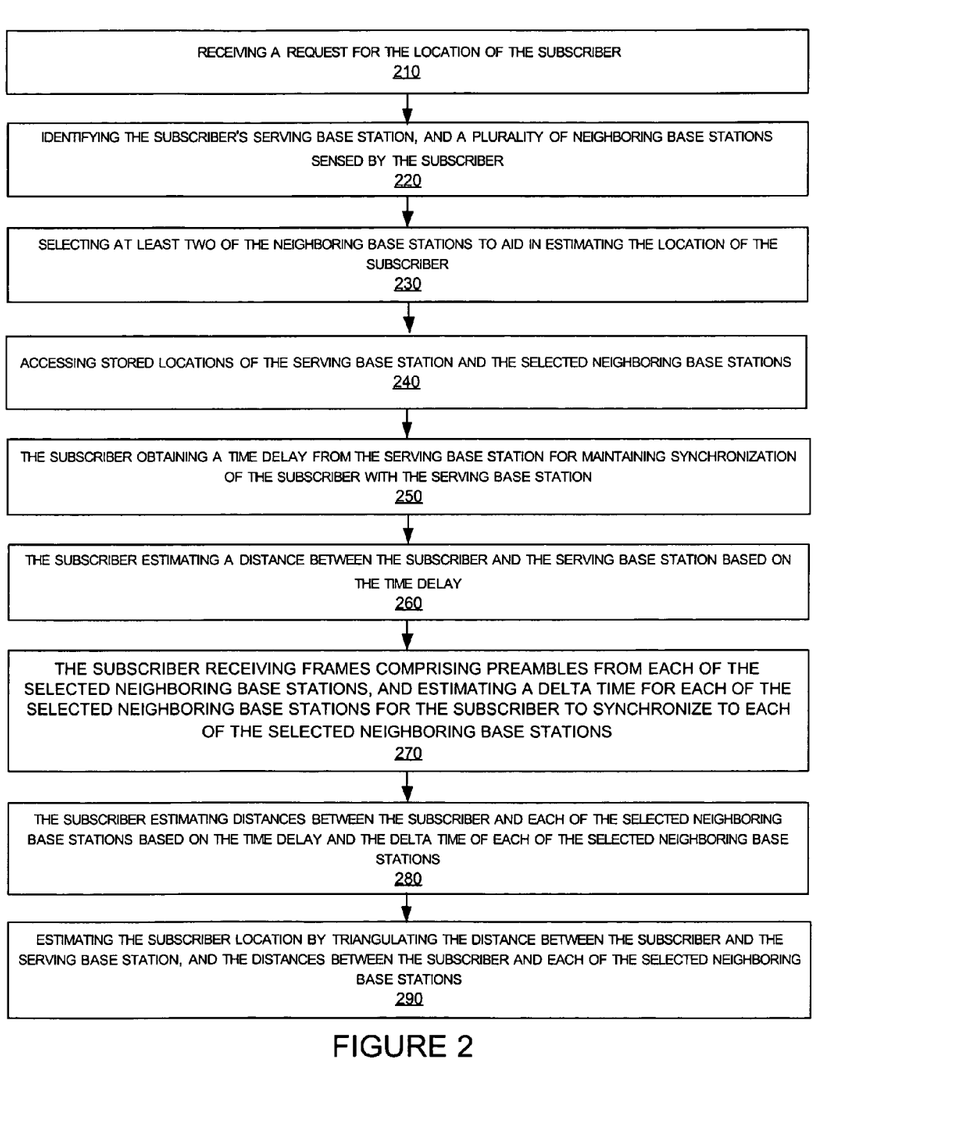
FIG. 2 is a flow chart that includes steps of one example of a method of estimating a location of a mobile subscriber.

FIG. 2 is a flow chart that includes steps of one example of a method of estimating a location of a mobile subscriber. A first step 210 includes receiving a request for the location of the subscriber. A second step 220 includes identifying the subscriber's serving base station, and a plurality of neighboring base stations sensed by the subscriber. A third step 230 includes selecting at least two of the neighboring base stations to aid in estimating the location of the subscriber. A fourth step 240 includes accessing stored locations of the serving base station and the selected neighboring base stations. A fifth step 250 includes the subscriber obtaining a time delay from the serving base station for maintaining synchronization of the subscriber with the serving base station. A sixth step 260 includes the subscriber estimating a distance between the subscriber and the serving base station based on the time delay. A seventh step 270 includes the subscriber receiving frames comprising preambles from each of the selected neighboring base stations, and estimating a delta time for each of the selected neighboring base stations for the subscriber to synchronize to each of the selected neighboring base stations. An eighth step 280 includes the subscriber estimating distances between the subscriber and each of the selected neighboring base stations based on the time delay and the delta time of each of the selected neighboring base stations. A ninth step 290 includes estimating the subscriber location by triangulating the distance between the subscriber and the serving base station, and the distances between the subscriber and each of the selected neighboring base stations.

For location determination, it is desirable to select at least two neighboring base stations. However, it is to be understood that more can be selected (for example, to provide elevation estimation as well), or fewer could be selected if less than two are available. However, if less than two neighboring base stations have wireless signals available for reception by the subscriber, then the location estimation is generally less accurate.

For an embodiment, selecting at least two of the neighboring base stations includes determining the at least two neighboring base stations having the largest received signal power at the subscriber. For another embodiment, selecting at least two of the neighboring base stations includes analyzing a relative physical orientation of the neighboring base stations and the serving base station and selecting the at least two neighboring base stations that along with the serving base station provide a non-collinear spatial distribution about the subscriber. That is, it is generally desirable for the subscriber to be located within an area that has its perimeter defined by the serving base station and the neighboring base station.

For an embodiment, the neighboring base stations are identified by the subscriber by the subscriber running a scan of available base stations. The scan can be performed, for example, to provide the subscriber with a list of neighboring base stations that the subscriber may connect to if the subscriber physically moves and needs to handoff to a new serving base station. The scans can become stale over time. Therefore, an embodiment includes a subscriber scan of neighboring base stations being initiated if a scan has not been performed in greater than a threshold amount of time.

For a cellular network in which each cell includes sectors, a scan by the subscriber can yield both potential base station handoffs and same-cell sector handoffs. Accordingly, an embodiment includes the subscriber scanning for a potential subscriber handoff base stations, and pruning the scan yielding the neighboring base stations. That is, the sector information is eliminated.

Embodiments include the subscriber obtaining an estimate of the propagation time delay for signals transmitted between the subscriber and the base stations. For an embodiment, the propagation time delay is estimated based on a time delay the subscriber receives from the serving base station for maintaining synchronization of the subscriber with the serving base station.

For an embodiment, the subscriber obtaining a time delay includes estimating a time of arrival of a serving base station signal by extracting information from a downlink frame preamble, and obtaining the time delay based on the estimated time of arrival. For an embodiment, extracting information from a downlink frame preamble includes determining a channel impulse response of the preamble, and estimating the time of arrival by comparing a peak of the channel impulse response with a pre-estimated start time of the downlink frame preamble. For an embodiment, determining a channel impulse response of the preamble includes performing a fast fourier transform (FFT) on the downlink frame preamble, correlating an output of the FFT with a predetermined pseudo random bit sequence (PRBS), and performing an inverse fast fourier transform (IFFT) on the correlated output. For an embodiment, the subscriber averages the time delay over multiple frames.

For another embodiment, the subscriber obtaining a time delay from the serving base station for maintaining synchronization of the subscriber with the serving base station includes the subscriber transmitting a signal to the serving base station within an unscheduled portion of an uplink sub-frame, having a time offset of zero. The serving base station receives the signal, and estimates the time delay required for the subscriber to align subscriber transmissions to a start time of the unscheduled portion of the uplink sub-frame. The serving base station communicates the time delay to the subscriber, and the subscriber estimates a transmission delay between the subscriber and the serving base station as being equivalent to the time delay. For an embodiment, the serving base station averages the time delay over multiple frames before communicating the time delay to the subscriber.

Additionally, embodiments include the subscriber estimating a propagation delay between the subscriber and each of the selected neighboring base stations. For an embodiment, estimating a delta time for each of the selected neighboring base stations for the subscriber to synchronize to each of the selected neighboring base stations includes, based on preambles of wireless signal frames received from each of the selected neighboring base stations, the subscriber estimating the delta time that required to synchronize the subscriber with each of the selected neighboring base stations, and the subscriber estimating a transmission delay between the subscriber and each of the selected neighboring base stations based on the time delay and the delta time of each of the selected neighboring base stations. For an embodiment, the subscriber averages the delta time of each of the selected neighboring base stations, over multiple frames.

Figure 3:
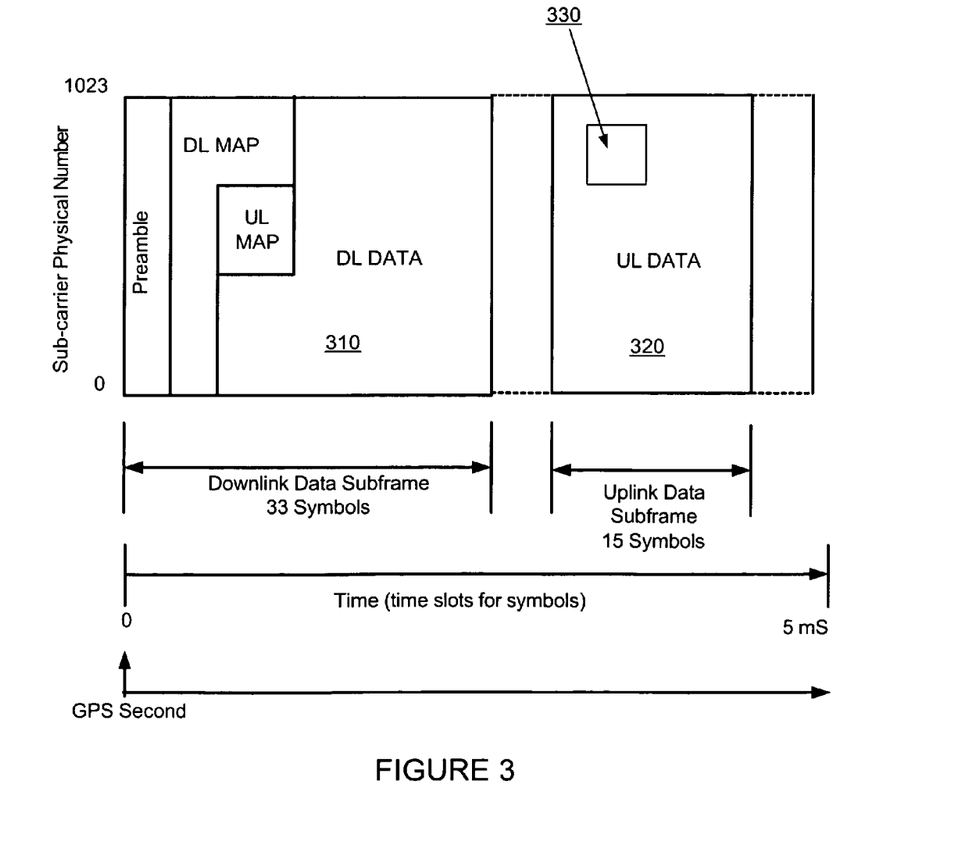
FIG. 3 shows an example of WiMAX frame that includes a preamble that a mobile subscribe can use to synchronize to a serving base station and neighboring base station.

FIG. 3 shows an example of WiMAX frame that includes a preamble that a mobile subscribe can use to synchronize to a serving base station and neighboring base stations. The WiMAX signals, and therefore, the preamble, are synchronized with GPS signals. WiMAX signals can be received by a subscriber, and used by the subscriber to aid in estimating its position.

The WiMAX downlink frame 310 generally includes the preamble, a downlink (DL) MAP, an uplink (UL) MAP, and downlink (DL) data. The preamble is the first symbol of the DL portion of the frame. For WiMAX implementations using a Fast Fourier Transform (FFT) size of 1024, the preamble consists of 284 pilots that have a nominal spacing of three (for example, 10 KHz tones). WiMAX implementations using different FFT sizes consist of different numbers of preamble tones. There are three preamble segments which each occupy different pilot positions. The preamble pilots from the three segments are non-overlapping. A pseudorandom sequence modulates the pilots of the preamble. These sequences are chosen such that neighboring base stations do not share a common pseudorandom sequence. The pilots on the preamble are boosted by 9 dB. For this reason, the power on the preamble is nominally higher than on any other portion of the DL subframe 310.

Generally, the preamble does not contain any data modulation, so all pilots may be used in determining the channel impulse response. The time of arrival of a signal from a specific base station can be deduced from the channel impulse response. The base station to be measured may be selected by choosing the correct preamble segment and pseudorandom sequence. The preamble exhibits several useful properties. The preamble is transmitted with high power, has a large time-bandwidth product, and is not modulated by data. For an embodiment, the preamble has a regular pilot spacing of three which implies that the channel impulse response contains substantially replicas. The spacing between these replicas provides a large interval over which timing ambiguity due to the presence of replicas may be avoided.

An unscheduled portion 330 of the uplink frame 320 is set aside for unscheduled uplink transmissions. For example, the subscriber may have data for transmission on the uplink. However, the serving base station may not have allocated any bandwidth (within the scheduling) for the subscriber on the uplink. The subscriber can transmit a pseudo-random code requesting the base station to allocate uplink bandwidth to the subscriber.

Figure 4:
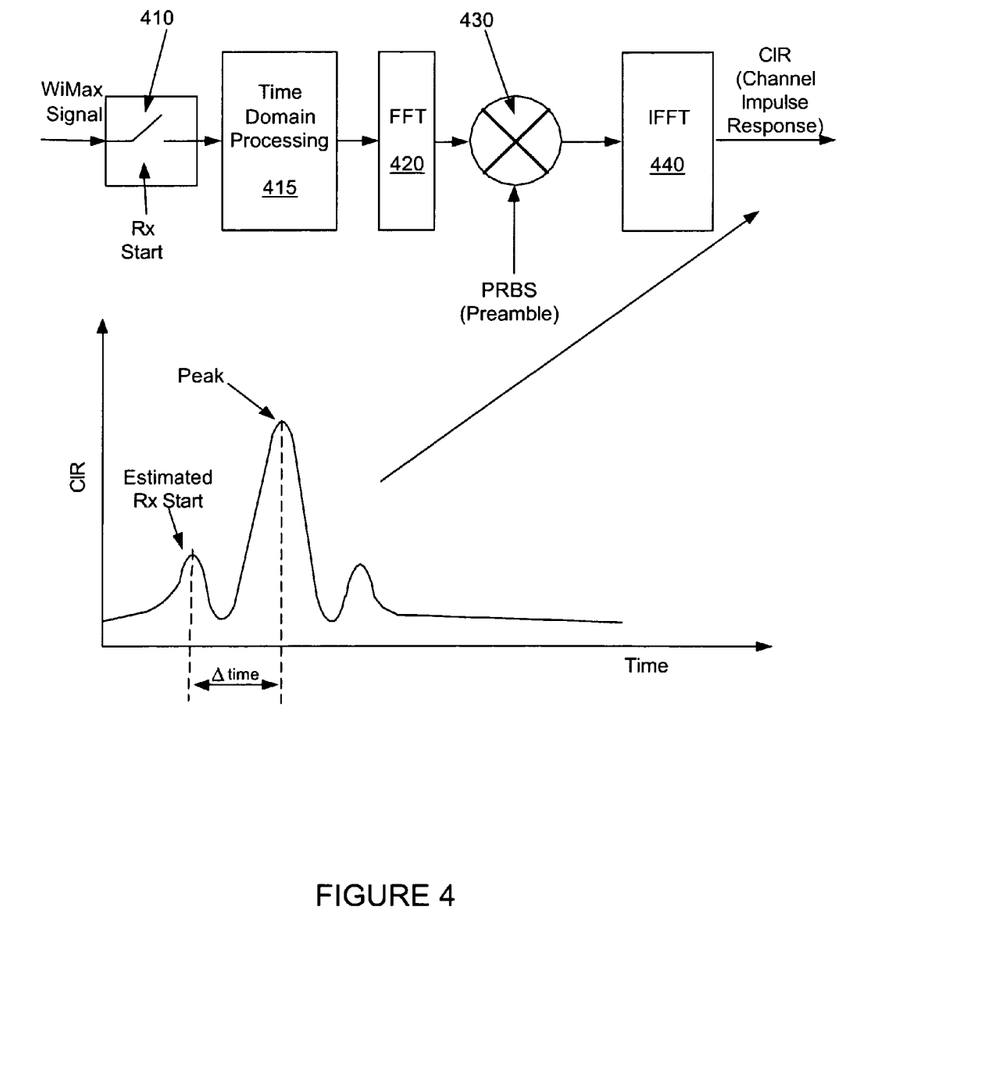
FIG. 4 shows a block diagram of an embodiment of controls within a subscriber that can estimate a time of arrival of a preamble of a downlink frame of a serving base station signal.

FIG. 4 shows a block diagram of an embodiment of controls within a subscriber that can estimate a time of arrival of a preamble of a downlink frame of a serving base station signal. This embodiment can, for example, extract information from a WiMAX downlink frame preamble that can be used to estimate a time of arrival of the preamble of the WiMAX downlink frame.

More specifically, the embodiment shown provides a method of determining a channel impulse response of the preamble. Timing of a peak of the channel impulse response can be used to estimate the time of arrival of the WiMAX signal. The estimate can be obtained by comparing the peak of the channel impulse response with a pre-estimated start time of the WiMAX downlink frame preamble. The pre-estimated start may be based on previous measurement of the peak location.

In other embodiments, the location of the first component of the CIR that exceeds a fraction of the peak amplitude may be used as an estimate of the time of arrival of the terrestrial signal. In still other embodiments, the location of the first component of the CIR that exceeds a pre-determined threshold may be used as an estimate of the time of arrival of the terrestrial signal.

As shown, the received WiMAX signal is sampled by, for example, a sampler 410 that begins sampling in response to the rx_start signal which is asserted at a pre-determined time. This time generally corresponds to an estimate of the first significant component of the channel impulse response. The sampled signal is passed through time domain processing block 415 the output of which is input to an FFT (Fast Fourier Transform) 420, correlated with a PRBS (pseudo random bit sequence) 430 that corresponds with the base station of the received WiMAX signal, and then passed through an IFFT (Inverse Fast Fourier Transform) 440 producing the channel impulse response.

Figure 5:
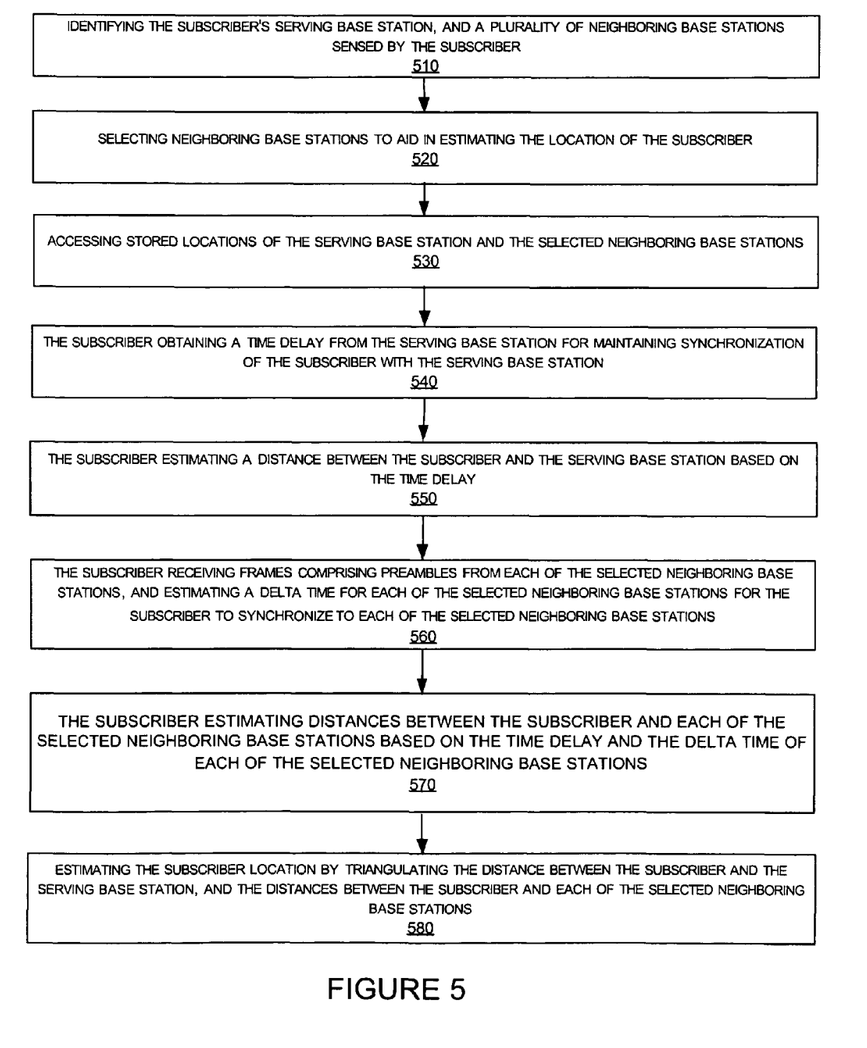
FIG. 5 is a flow chart that includes steps of another example of a method of estimating a location of a mobile subscriber.

FIG. 5 is a flow chart that includes steps of another example of a method of estimating a location of a mobile subscriber. A first step 510 includes identifying the subscriber's serving base station, and a plurality of neighboring base stations sensed by the subscriber. Note that the number of neighboring base station sensed by the subscriber may be less than two. That is, less than a plurality. In this case, the subscriber estimates the location as well as it can, though the estimate may not be accurate. A second step 520 includes selecting neighboring base stations to aid in estimating the location of the subscriber. A third step 530 includes accessing stored locations of the serving base station and the selected neighboring base stations. A fourth step 540 includes the subscriber obtaining a time delay from the serving base station for maintaining synchronization of the subscriber with the serving base station. A fifth step 550 includes the subscriber estimating a distance between the subscriber and the serving base station based on the time delay. A sixth step 560 includes the subscriber receiving frames comprising preambles from each of the selected neighboring base stations, and estimating a delta time for each of the selected neighboring base stations for the subscriber to synchronize to each of the selected neighboring base stations. A seventh step 570 includes the subscriber estimating distances between the subscriber and each of the selected neighboring base stations based on the time delay and the delta time of each of the selected neighboring base stations. An eighth step 580 includes estimating the subscriber location by triangulating the distance between the subscriber and the serving base station, and the distances between the subscriber and each of the selected neighboring base stations.

Figure 6:
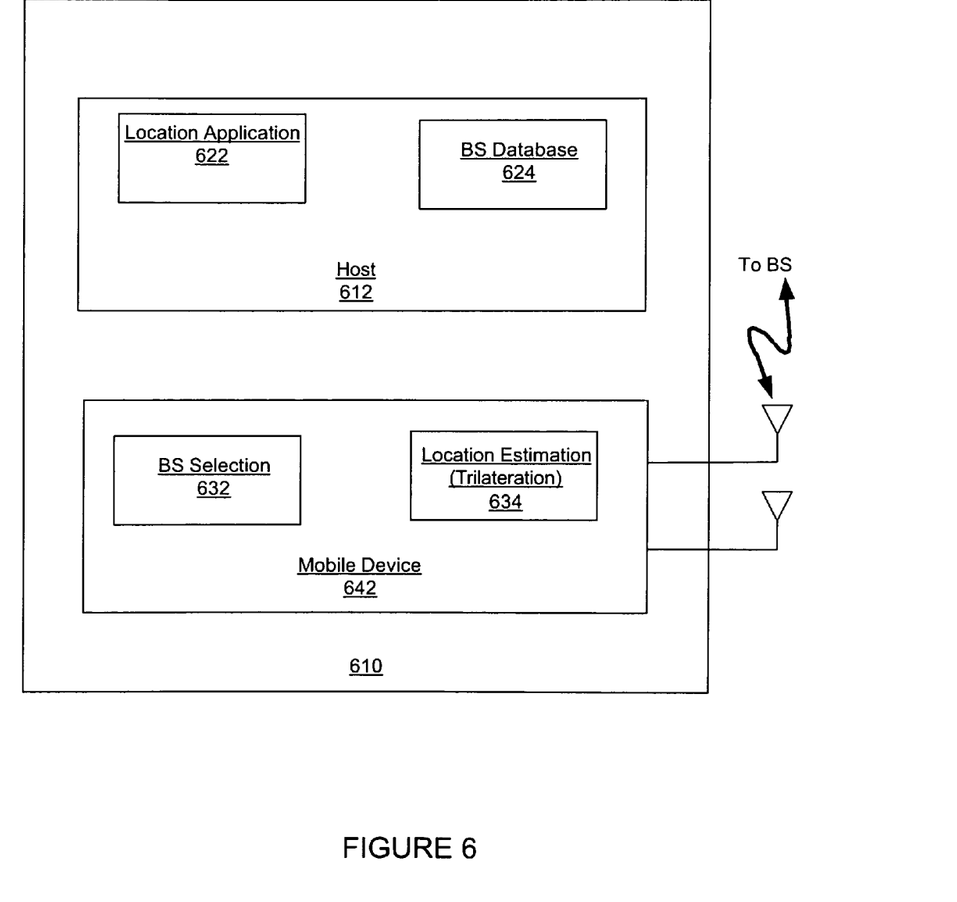
FIG. 6 shows a block diagram of an embodiment of a subscriber.

FIG. 6 shows a block diagram of an embodiment of a subscriber. This embodiment of the subscriber 610 includes a host 612 and a mobile device 642. An embodiment of the host 612 generates the request for the subscriber's location (through, for example, a location application 622), and accesses the stored locations (through, for example, a BS (base station) database 624) of the serving base station and the selected neighboring base stations.

The host 612 can be, for example, a personal computer. The mobile device 642 can be, for example, a WiMAX dongle or an SDIO card. The mobile device 642 interfaces with the host, and communicates, for example, through antennas to the serving base station. As described, embodiments of the mobile device 642 perform the neighboring base station selection (through, for example, BS selection processing 632) and perform trilateration calculations (through, for example, trilateration processing 634).

An embodiment of the mobile device 642 includes the mobile device identifying the subscriber's serving base station and the plurality of neighboring base stations sensed by the subscriber, selecting at least two of the neighboring base stations to aid in estimating the location of the subscriber, obtaining the time delay from the serving base station for maintaining synchronization of the subscriber with the serving base station, and estimating the distance between the subscriber and the serving base station based on the time delay. Further, the subscriber receives frames including preambles from each of the selected neighboring base stations, and estimates the delta time for each of the selected neighboring base stations for the subscriber to synchronize to each of the selected neighboring base stations, and estimates distances between the subscriber and each of the selected neighboring base stations based on the time delay and the delta time of each of the selected neighboring base stations. The subscriber estimates the subscriber location by triangulating the distance between the subscriber and the serving base station, and the distances between the subscriber and each of the selected neighboring base stations.

Although specific embodiments of the invention have been described and illustrated, the invention is not to be limited to the specific forms or arrangements of parts so described and illustrated. The invention is limited only by the appended claims.

What is claimed:

1. A method of estimating a location of a subscriber, comprising:

receiving a request for the location of the subscriber;
identifying a serving base station of the subscriber, and a plurality of neighboring base stations sensed by the subscriber;
obtaining a time delay from the serving base station for maintaining synchronization of the subscriber with the serving base station by comparing a time of a peak of a channel impulse response related to a downlink preamble received from the serving base station with a start time associated with the downlink preamble, the start time being estimated based on the channel impulse response exceeding a predetermined threshold value;
estimating a distance between the subscriber and the serving base station based on the time delay;
receiving frames from at least two of the plurality of neighboring base stations, and estimating a delta time for each of the at least two neighboring base stations for the subscriber to synchronize to each of the at least two neighboring base stations;
estimating distances between the subscriber and each of the at least two neighboring base stations based on the delta time for each of the at least two neighboring base stations; and
estimating the subscriber location by trilateration of the distance between the subscriber and the serving base station, and the distances between the subscriber and each of the at least two neighboring base stations.

2. The method of claim 1, wherein the receiving frames from at least two of the plurality of neighboring base stations comprises:
receiving frames from at least two of the plurality of neighboring base stations having the largest received signal power at the subscriber.

3. The method of claim 1, wherein the receiving frames from at least two of the plurality of neighboring base stations comprises:
analyzing a relative physical orientation of the plurality of neighboring base stations and the serving base station; and receiving frames from at least two of the plurality of neighboring base stations that along with the serving base station provide a non-collinear spatial distribution about the subscriber.

4. The method of claim 1, further comprising:
initiating a subscriber scan of the plurality of neighboring base stations when a scan has not been initiated in greater than a threshold amount of time.

5. The method of claim 1, wherein the identifying the plurality of neighboring base stations comprises:
scanning for potential subscriber handoff base stations, pruning sector information from the scanning, and yielding the plurality of neighboring base stations.

6. The method of claim 1, wherein the obtaining a time delay comprises:
performing a fast fourier transform (FFT) on the downlink preamble;
correlating an output of the FFT with a predetermined pseudo random bit sequence (PRBS); and
performing an inverse fast fourier transform (IFFT) on the correlated output.

7. The method of claim 1, wherein the obtaining a time delay comprises:
transmitting a signal to the serving base station within an unscheduled portion of an uplink sub-frame, having a time offset of zero;
receiving a time delay from the serving base station, the time delay assisting the subscriber in aligning subscriber transmissions to a start time of the unscheduled portion of the uplink sub-frame; and
estimating a transmission delay between the subscriber and the serving base station based on the time delay.

8. The method of claim 7, wherein the receiving the time delay comprises averaging the time delay over multiple frames.

9. The method of claim 1, wherein the estimating a delta time for each of the at least two neighboring base stations comprises:
estimating, based on preambles of wireless signal frames received from each of the at least two neighboring base stations, the delta time required to synchronize the subscriber with each of the at least two neighboring base stations; and
estimating a transmission delay between the subscriber and each of the at least two neighboring base stations based on the time delay and the delta time of each of the at least two neighboring base stations.

10. The method of claim 9, further comprising:
averaging the delta time of each of the at least two neighboring base stations over multiple frames.

11. The method of claim 1, wherein the subscriber comprises a host and a mobile device.

12. The method of claim 11, wherein the host generates the request for the subscriber's location, and accesses the stored locations of the serving base station and the at least two neighboring base stations.

13. The method of claim 11, wherein the mobile device identifies a serving base station of the subscriber and the plurality of neighboring base stations sensed by the subscriber, obtains the time delay from the serving base station for maintaining synchronization of the subscriber with the serving base station, estimates the distance between the subscriber and the serving base station based on the time delay, receives frames from at least two of the plurality of neighboring base stations, and estimates the delta time for each of the at least two neighboring base stations for the subscriber to synchronize to each of the at least two neighboring base stations, estimates distances between the subscriber and each of the at least two neighboring base stations based on the the delta time for each of the at least two neighboring base stations, and estimates the subscriber location by triangulating the distance between the subscriber and the serving base station, and the distances between the subscriber and each of the at least two neighboring base stations.

14. A method of estimating a location of a subscriber, comprising:
identifying a serving base station of the subscriber, and a plurality of neighboring base stations sensed by the subscriber;
obtaining a time delay from the serving base station for maintaining synchronization of the subscriber with the serving base station by comparing a time of a peak of a channel impulse response related to a downlink preamble received from the serving base station with a start time associated with the downlink preamble. the start time being estimated based on the channel impulse response exceeding a predetermined threshold value;
estimating a distance between the subscriber and the serving base station based on the time delay;
receiving frames from at least two of the plurality of neighboring base stations, and estimating a delta time for each of the at least two neighboring base stations for the subscriber to synchronize to each of the at least two neighboring base stations;

estimating distances between the subscriber and each of the at least two neighboring base stations based on the delta time for each of the at least two neighboring base stations; and estimating the subscriber location by triangulating the distance between the subscriber and the serving base station, and the distances between the subscriber and each of the at least two neighboring base stations.

15. A method of a mobile device estimating a location, comprising:

identifying a serving base station, and a plurality of sensed neighboring base stations;

obtaining a time delay from the serving base station for maintaining synchronization with the serving base station by comparing a time of a peak of a channel impulse response related to a downlink preamble received from the serving base station with a start time associated with the downlink preamble. the start time being estimated based on the channel impulse response exceeding. a predetermined threshold value;

estimating a distance between the mobile device and the serving base station based on the time delay;

receiving frames from at least two of the plurality of neighboring base stations, and estimating a delta time for each of the at least two neighboring base stations for the mobile device to synchronize to each of the at least two neighboring base stations;

estimating distances between the mobile device and each of the at least two neighboring base stations based on the delta time for each of the at least two neighboring base stations; and estimating the location by triangulating the distance between the mobile device and the serving base station, and the distances between the mobile device and each of the at least two neighboring base stations.

* * * * *

UNITED STATES PATENT AND TRADEMARK OFFICE
CERTIFICATE OF CORRECTION

| | |
|---|---|
| PATENT NO. | : 8,290,508 B2 |
| APPLICATION NO. | : 12/460693 |
| DATED | : October 16, 2012 |
| INVENTOR(S) | : Medapalli et al. |

It is certified that error appears in the above-identified patent and that said Letters Patent is hereby corrected as shown below:

In the Claims

Column 8
Line 42, Claim 13, please replace "the the" with --the--.

Column 8
Line 58, Claim 14, please replace "preamble." with --preamble,--.

Column 9
Line 18, Claim 15, please replace "preamble." with --preamble,--.

Column 10
Line 1, Claim 15, please replace "exceeding." with --exceeding--.

Signed and Sealed this
Twenty-third Day of July, 2013

Teresa Stanek Rea
*Acting Director of the United States Patent and Trademark Office*